United States Patent
Yamazaki et al.

(10) Patent No.: US 8,010,716 B2
(45) Date of Patent: *Aug. 30, 2011

(54) METHODS AND APPARATUS FOR SUPPORTING MULTIPLE CONFIGURATIONS IN A MULTI-PROCESSOR SYSTEM

(75) Inventors: Takeshi Yamazaki, Kanagawa (JP); Scott Douglas Clark, Rochester, MN (US); Charles Ray Johns, Austin, TX (US); James Allan Kahle, Austin, TX (US)

(73) Assignees: Sony Computer Entertainment Inc., Tokyo (JP); International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/858,915

(22) Filed: Aug. 18, 2010

(65) Prior Publication Data

US 2010/0312969 A1 Dec. 9, 2010

Related U.S. Application Data

(63) Continuation of application No. 11/250,246, filed on Oct. 14, 2005, now Pat. No. 7,802,023.

(60) Provisional application No. 60/619,069, filed on Oct. 15, 2004.

(51) Int. Cl.
*G06F 3/00* (2006.01)
*G06F 13/00* (2006.01)

(52) U.S. Cl. .......................... 710/14; 710/105

(58) Field of Classification Search .................. 710/14, 710/105
See application file for complete search history.

(56) References Cited

U.S. PATENT DOCUMENTS

| | | | | |
|---|---|---|---|---|
| 6,487,619 B1* | 11/2002 | Takagi | | 710/105 |
| 6,526,491 B2* | 2/2003 | Suzuoki et al. | | 711/164 |
| 7,093,080 B2* | 8/2006 | Day et al. | | 711/141 |
| 7,321,958 B2* | 1/2008 | Hofstee et al. | | 711/153 |
| 7,509,457 B2* | 3/2009 | Altman et al. | | 711/119 |
| 2002/0061012 A1* | 5/2002 | Thi et al. | | 370/352 |
| 2003/0088741 A1* | 5/2003 | Peng et al. | | 711/146 |
| 2005/0097231 A1* | 5/2005 | Hofstee et al. | | 710/8 |
| 2005/0097280 A1* | 5/2005 | Hofstee et al. | | 711/148 |
| 2005/0160239 A1* | 7/2005 | Johns | | 711/146 |

OTHER PUBLICATIONS

Office Action for related U.S. Appl. No. 11/250,246, Jan. 5, 2010.
Office Action for related U.S. Appl. No. 11/250,246, Jun. 23, 2009.
Office Action for related U.S. Appl. No. 11/250,246, Dec. 11, 2008.
Office Action for related U.S. Appl. No. 11/250,246, Jun. 12, 2008.
Office Action for related U.S. Appl. No. 11/250,246, Nov. 8, 2007.
U.S. Appl. No. 11/250,246, which is the parent application under 35 U.S.C. § 120 , Oct. 14, 2005.
Time Domain Integration, http//okinawa.nict.go.jp, pp. 1-2.
Frequency Domain Integration, http//okinawa.nict.go.jp, pp. 1-2.

* cited by examiner

*Primary Examiner* — Henry W Tsai
*Assistant Examiner* — Hyun Nam
(74) *Attorney, Agent, or Firm* — Matthew B. Dernier, Esq.; Gibson & Dernier LLP

(57) ABSTRACT

Methods and apparatus provide for interconnecting one or more multiprocessors and one or more external devices through one or more configurable interface circuits, which are adapted for operation in: (i) a first mode to provide a coherent symmetric interface; or (ii) a second mode to provide a non-coherent interface.

21 Claims, 9 Drawing Sheets

METHODS AND APPARATUS FOR SUPPORTING MULTIPLE CONFIGURATIONS IN A MULTI-PROCESSOR SYSTEM

CROSS REFERENCE TO RELATED APPLICATION

This application is a continuation of U.S. Ser. No. 11/250,246, filed Oct. 14, 2005, now allowed, and claims the benefit of U.S. Provisional Patent Application No. 60/619,069, filed Oct. 15, 2004, both applications entitled "METHODS AND APPARATUS FOR SUPPORTING MULTIPLE CONFIGURATIONS IN A MULTI-PROCESSOR SYSTEM," the entire disclosures of which applications are hereby incorporated by reference.

BACKGROUND

The present invention relates to methods and apparatus for achieving multiple processing configurations using a multi-processor system architecture.

In recent years, there has been an insatiable desire for faster computer processing data throughputs because cutting-edge computer applications involve real-time, multimedia functionality. Graphics applications are among those that place the highest demands on a processing system because they require such vast numbers of data accesses, data computations, and data manipulations in relatively short periods of time to achieve desirable visual results. These applications require extremely fast processing speeds, such as many thousands of megabits of data per second. While some processing systems employ a single processor to achieve fast processing speeds, others are implemented utilizing multi-processor architectures. In multi-processor systems, a plurality of sub-processors can operate in parallel (or at least in concert) to achieve desired processing results.

Some multiprocessing systems contemplate interconnections via interfaces in a matrix configuration to improve processing throughput and versatility. Examples of such configurations are disclosed in U.S. Patent Publication No.: 2005/0097231 and U.S. Pat. No. 6,526,491, the entire disclosures of which are hereby incorporated by reference. While the techniques disclosed in these documents may be useful in various applications, they may not provide the level of flexibility and/or programmability desirable in other applications.

Accordingly, there are needs in the art for new methods and apparatus for interconnecting one or more multiprocessor systems with one or more external devices to achieve higher processing capabilities.

SUMMARY

In accordance with one or more aspects of the present invention, a processing element (PE) (employing a plurality of distinct parallel processors) includes a broadband interface controller (BIC) that provides either a coherent or non-coherent, high-performance interconnection for attaching other PEs, memory subsystems, switches, bridge chips, etc. The BIC provides two flexible interfaces with varying protocols and bandwidth capabilities to address differing system requirements. The interfaces can be configured as either two I/O interfaces (IOIF 0/1) or as an I/O and a coherent SMP interface (IOIF & BIF). When the BIC is configured to operate as a coherent SMP interface, the BIC provides the PE with a high-performance, coherent interconnection. When the BIC is configured to operate as an I/O interface, the BIC provides the PE with a high-performance (non-coherent) interconnection.

The BIC includes a logical layer, a transport layer, a data link layer, and a physical link layer. The logical layer (and in some embodiments the transport layer) may be adapted to change the operation of the BIC between a coherent SMP interface (BIF) and a non-coherent interface (IOIF). The logical layer defines the basic operation of the BIF or IOIF, including the ordering and coherency rules. The transport layer defines how command and data packets are transferred between devices. Command and data packets are preferably separated into smaller units referred to as physical layer groups (PLGs) for presentation to the data link layer. The data link layer defines the facilities that ensure (substantially) error free transmission of information between the sender and the receiver. The physical layer defines the electrical characteristics and timing of the I/O drivers and describes how data link envelopes are transmitted across physical links. The physical link layer preferably supports the concurrent operation of up to two sets of logical/transport/data link layers and a configurable method of apportioning the available bandwidth of the physical layer between the two.

The functionality and operation of the logical layer, transport layer, data link layer, and physical layer of the BIC, are preferably such that the physical layer bandwidth may be divided between two interfaces so long as the total bandwidth of the (BIF and/or IOIF) interfaces do not exceed the maximum bandwidth of the physical layer. By way of example, the physical layer may have a total raw output bandwidth of 35 GB/s and a total raw input bandwidth of 25 GB/s.

In accordance with one or more further embodiments of the present invention flexible interfaces of the BIC enable significant flexibility in the system configuration into which one or more of the processor elements is disposed. For example, the BIC may be operable to implement dual I/O interfaces (IOIF0 and IOIF1) to set up respective non-coherent interfaces between the PE and two devices. The physical layer input/output bandwidth of the BIC may be divided between the two IOIF interfaces as long as the sum of the two interfaces does not exceed the total bandwidth of the physical layer (e.g., 30 GB/s out and 25 GB/s in).

In accordance with an alternative embodiment, two processor elements may be cascaded by each employing its respective BIC in a coherent symmetric multiprocessor (SMP) interface (or BIF) configuration. The coherent SMP interface (BIF) of each processing element is coupled to one another to set up a coherent interface therebetween. The IOIF of each processing element may send and receive data to/from other devices in a non-coherent fashion. Again, the physical layer input/output bandwidth of each BIC may be divided between its two interfaces.

In accordance with a further alternative embodiment, more than two processor elements may be cascaded by each employing its respective BIC in a coherent SMP interface (BIF) configuration. A centrally disposed processor element may employ a BIC having two BIFs. A pair of terminally disposed processor elements may frame the centrally disposed processor element and each employ a BIC having one BIF and one IOIF. The BIF of each processing element may be coupled to one another to set up a coherent interface therebetween. The IOIF of the terminal processing elements may send and receive data to/from other devices in a non-coherent fashion.

In accordance with a further alternative embodiment, more than two processor elements may be cascaded by each employing its respective BIC in the I/O and coherent SMP interface (IOIF & BIF) configuration. The coherent SMP interface (BIF) of each processing element may be coupled to a switch, which effectively couples the processing elements to one another to set up a coherent interface therebetween. The IOIF of each processing element may send and receive data to/from other devices in the system in a non-coherent fashion.

Other aspects, features, and advantages of the present invention will be apparent to one skilled in the art from the description herein taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PRESENT INVENTION

A description of a preferred computer architecture for a multi-processor system will now be provided that is suitable for carrying out one or more of the features discussed herein. In accordance with one or more embodiments, the multi-processor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system must complete tasks in a short and predictable time.

To this end, and in accordance with this computer architecture, all processors of a multi-processing computer system are constructed from a common computing module (or cell). This common computing module has a consistent structure and preferably employs the same instruction set architecture. The multi-processing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multi-processing computer system, and if a network is employed, the rapid transmission of applications and data over the network. This structure also simplifies the building of members of the network of various sizes and processing power and the preparation of applications for processing by these members.

Figure 1:
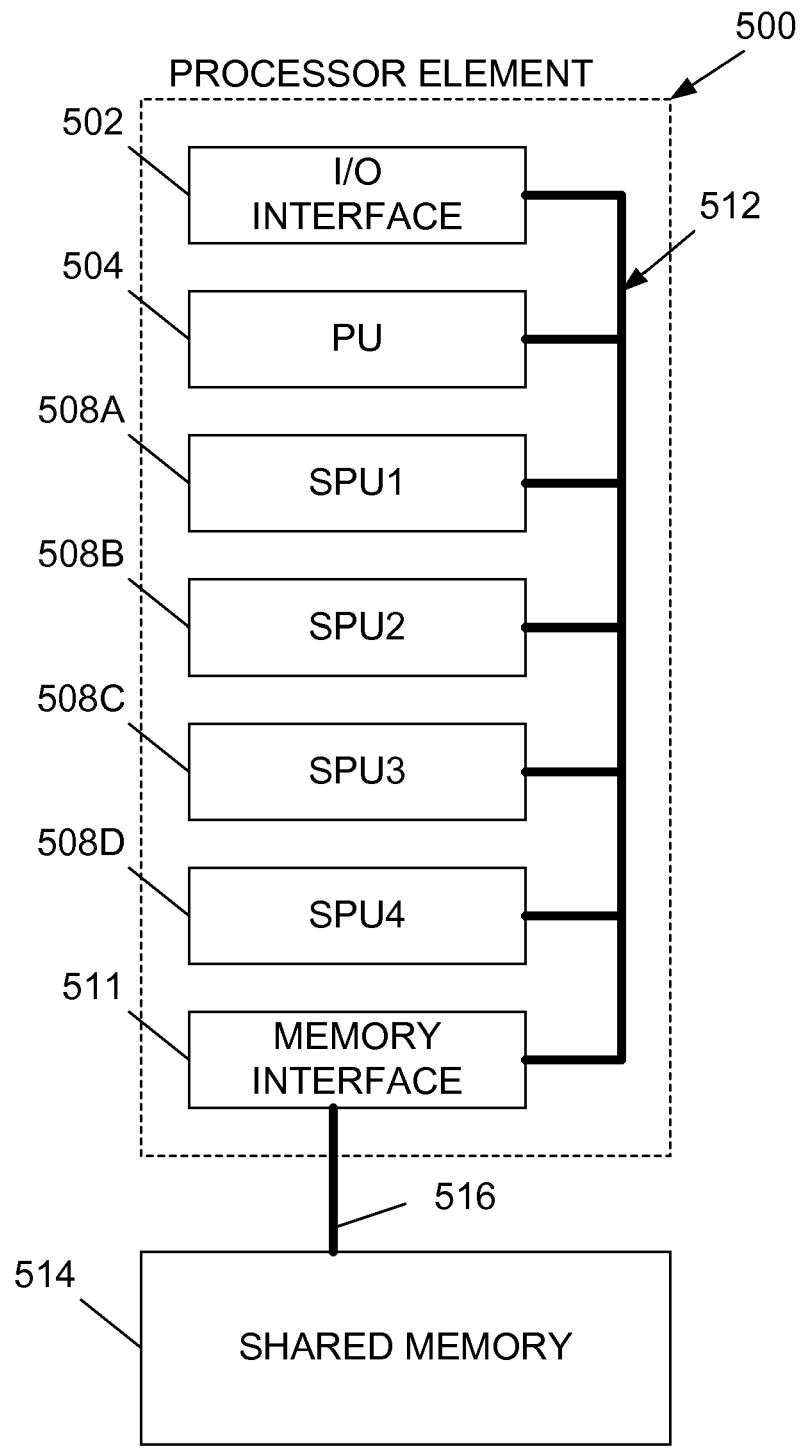
FIG. 1 is a block diagram illustrating the structure of a multi-processing system employing one or more embodiments of the present invention.
Figure 2:
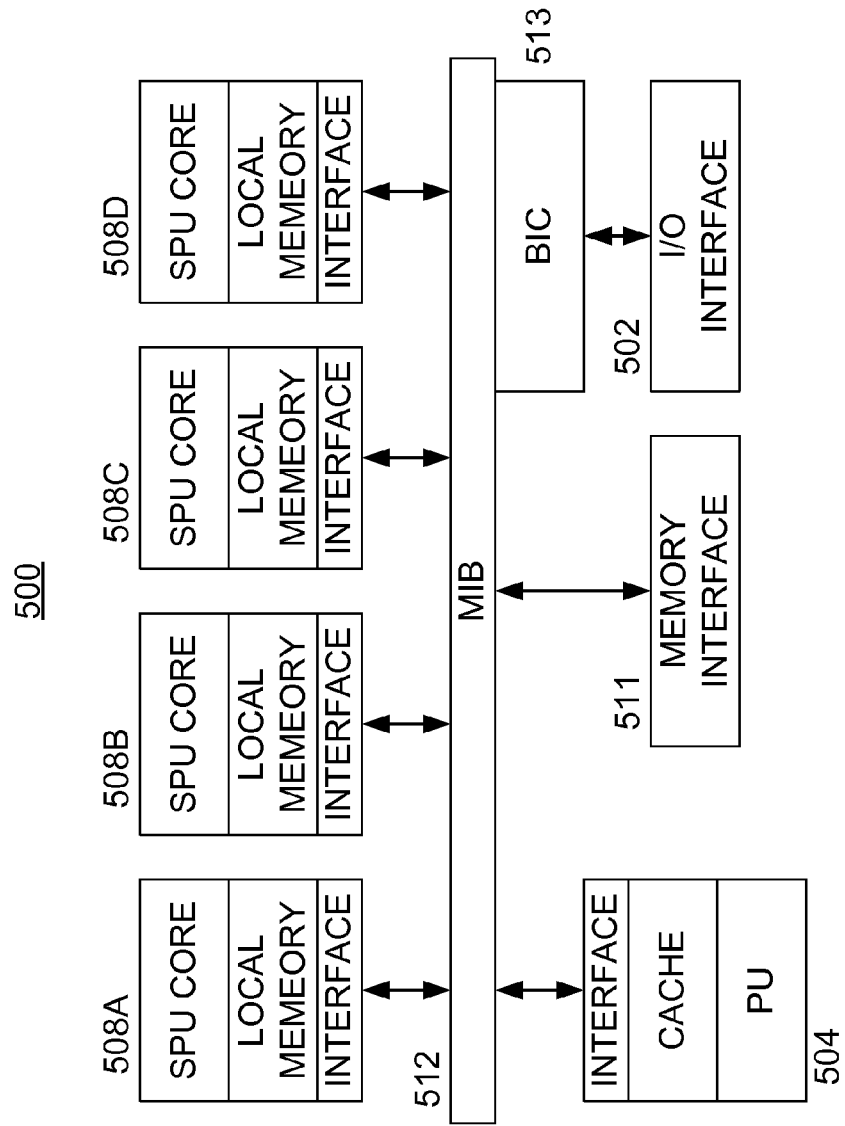
FIG. 2 is a block diagram illustrating further features that may be employed by the system of FIG. 1.

With reference to FIGS. 1 and 2, the basic processing module is a processor element (PE) 500. The PE 500 comprises an I/O interface 502, a processing unit (PU) 504, and a plurality of sub-processing units 508, namely, sub-processing unit 508A, sub-processing unit 508B, sub-processing unit 508C, and sub-processing unit 508D. A local (or internal) PE bus 512 transmits data and applications among the PU 504, the sub-processing units 508, and a memory interface 511. The local PE bus 512 can have, e.g., a conventional architecture or can be implemented as a packet-switched network. If implemented as a packet switch network, while requiring more hardware, increases the available bandwidth.

The PE 500 can be constructed using various methods for implementing digital logic. The PE 500 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. The PE 500 also may be implemented using superconducting material, e.g., rapid single-flux-quantum (RSFQ) logic.

The PE 500 is closely associated with a shared (main) memory 514 through a high bandwidth memory connection 516. Although the memory 514 preferably is a dynamic random access memory (DRAM), the memory 514 could be implemented using other means, e.g., as a static random access memory (SRAM), a magnetic random access memory (MRAM), an optical memory, a holographic memory, etc.

The PU 504 and the sub-processing units 508 are preferably each coupled to a memory flow controller (MFC) including direct memory access DMA functionality, which in combination with the memory interface 511, facilitate the transfer of data between the DRAM 514 and the sub-processing units 508 and the PU 504 of the PE 500. It is noted that the DMAC and/or the memory interface 511 may be integrally or separately disposed with respect to the sub-processing units 508 and the PU 504. Indeed, the DMAC function and/or the memory interface 511 function may be integral with one or more (preferably all) of the sub-processing units 508 and the PU 504. It is also noted that the DRAM 514 may be integrally or separately disposed with respect to the PE 500. For example, the DRAM 514 may be disposed off-chip as is implied by the illustration shown or the DRAM 514 may be disposed on-chip in an integrated fashion.

The PU 504 can be, e.g., a standard processor capable of stand-alone processing of data and applications. In operation, the PU 504 preferably schedules and orchestrates the processing of data and applications by the sub-processing units. The sub-processing units preferably are single instruction, multiple data (SIMD) processors. Under the control of the PU 504, the sub-processing units perform the processing of these data and applications in a parallel and independent manner. The PU 504 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 504 may be implemented by one of the sub-processing units 508 taking on the role of a main processing unit that schedules and orchestrates the processing of data and applications by the sub-processing units 508. Further, there may be more than one PU implemented within the processor element 500.

In accordance with this modular structure, the number of PEs 500 employed by a particular computer system is based upon the processing power required by that system. For example, a server may employ four PEs 500, a workstation may employ two PEs 500 and a PDA may employ one PE 500. The number of sub-processing units of a PE 500 assigned to processing a particular software cell depends upon the complexity and magnitude of the programs and data within the cell.

The Modular Interconnect Bus (MIB) 512 is a coherent bus, which may be organized as a number of (half-rate) rings that each support a plurality of simultaneous data transfers.

The MIC 511 is operable to facilitate communication between the PE and a plurality of memory banks, which implement the shared memory 514. The MIC 511 preferably operates asynchronously with respect to the processor and I/O interfaces.

The BIC 513 is a logical extension of the MIB 512 and provides an asynchronous interface between the MIB 512 and the I/O interface 502. The BIC 513 provides either a coherent or non-coherent, high-performance interconnection for attaching other PEs, memory subsystems, switches, bridge chips, etc. The BIC 513 provides two flexible interfaces with varying protocols and bandwidth capabilities to address differing system requirements. The interfaces can be configured as either two I/O interfaces (IOIF 0/1) or as an I/O and a coherent SMP interface (IOIF & BIF). The flexible interface operates with seven transmit and five receive bytes. When the BIC 513 is configured to operate as a coherent SMP interface, the BIC 513 provides the PE with a high-performance, coherent interconnection. When the BIC 513 is configured to operate as an I/O interface, the BIC 513 provides the PE with a high-performance (non-coherent) interconnection. The BIC 513 (operating as a BIF or IOIF) can also be used for other applications that require a high speed interface.

The BIC 513 facilitates carrying out transactions between the PE and the other PEs, memory subsystems, switches, bridge chips, etc. BIF and IOIF transactions are usually memory access requests (requests for data) resulting from a data transaction that cannot be serviced by a local cache hierarchy within the PE or an external device connected to the PE. A memory access request may require one or more transactions. A transaction can be initiated by a master device or a cache coherency controller (a snooper) and can result in a series of packet transfers between the master and slave. BIF and IOIF transactions are divided into three phases: commands (e.g., load and store), snoop, and data (although not all transactions require a data phase).

The BIF and IOIF features of the BIC 513 are operable to be scalable and flexible to support many different system configurations and future generation, compliant processors. The features of the BIC 513 include: (i) packet protocol to support cache coherency and data synchronization (when operating as a BIF); (ii) packet protocol with flags for ordering and coherency (when operating as an IOIF); (iii) fully pipelined command transactions, data transactions and response/reply transactions; (iv) split transactions; and (v) credit-based command and data support.

Figure 3:
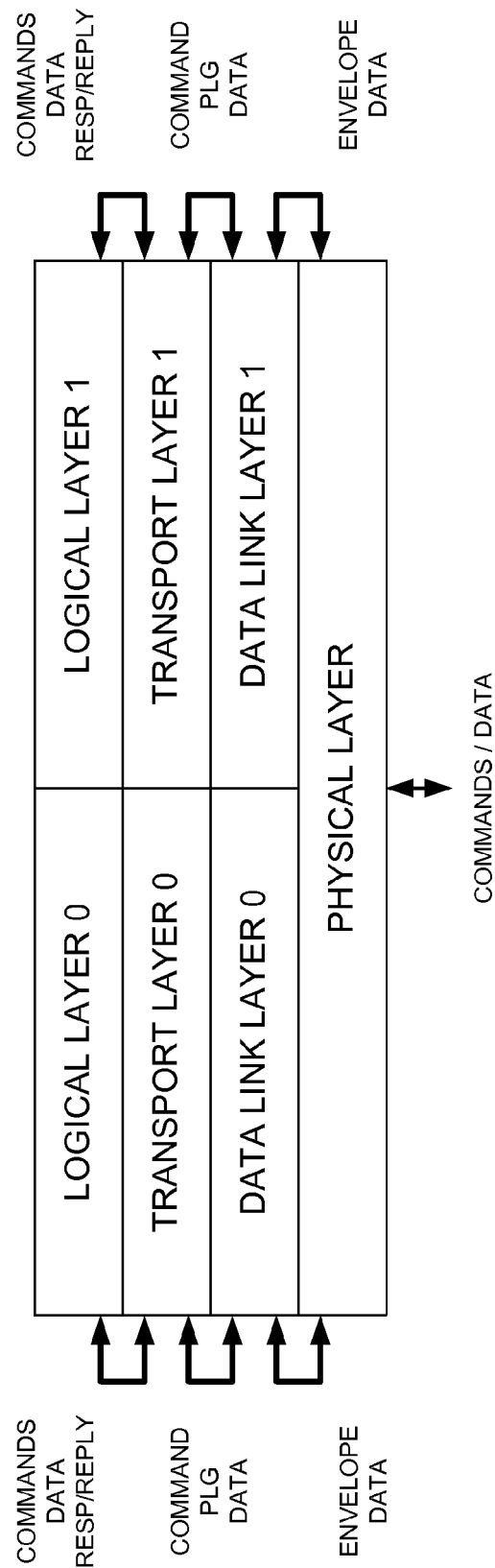
FIG. 3 is a block diagram of an interface controller suitable for use with the processing system in accordance with one or more aspects of the present invention.

Reference is now made to FIG. 3, which is a block diagram of one or more aspects of the BIC 513, which includes a logical layer (including at least two portions 0, 1), a transport layer (also including at least two portions 0, 1), a data link layer (also including at least two portions 0, 1), and a physical link layer. The logical layer (and in some embodiments the transport layer) may be adapted to change the operation of the BIC 513 between a coherent SMP interface (BIF) and a non-coherent interface (IOIF).

The logical layer defines the basic operation of the BIF or IOIF, including the ordering and coherency rules. Thus, a device attached to a PE that uses the BIF or IOIF should be fully compliant with the logical layer specification. In some applications, however, it may be possible to implement a subset of the logical layer specification and still be operational with the PE through the BIC 513. The information in the logical layer outlines the basic command (address), data, and response packets. When the logical layer is configured for a coherent SMP interface, then snoop response packets are permitted. When the logical layer is configured for a non-coherent interface, then only response packets are permitted.

The transport layer defines how command and data packets are transferred between devices. Command and data packets are preferably separated into smaller units referred to as physical layer groups (PLGs) for presentation to the data link layer. Also included in the transport layer is a definition of the flow control mechanism used for pacing the delivery of the PLGs. The transport layer is preferably capable of being customized to fit the needs of the system or application.

The data link layer defines the facilities that ensure (substantially) error free transmission of information between the sender and the receiver. Also included in this layer is the initialization or training sequence for the physical links. The data link layer is also preferably capable of being customized to fit the needs of a system or application.

The physical layer defines the electrical characteristics and timing of the I/O drivers and describes how data link envelopes are transmitted across physical links. The physical link layer preferably supports the concurrent operation of up to two sets of logical/transport/data link layers and a configurable method of apportioning the available bandwidth of the physical layer between the two. The physical layer may also define printed circuit board (PCB) routing and packaging guidelines. Among the goals of the physical layer is to hide the physical characteristics of the I/O drivers (such as speed, unidirectional versus bidirectional, and the number of I/Os) and to present a consistent interface to the data link layer. The input/output functionality may be achieved using Rambus RRAC I/Os, which enable substantial bandwidth support. For increased flexibility, the RRAC transmitters and receivers operate asynchronously to the processors and memory, and the available bandwidth configurable between the two interfaces.

Given the above functionality and operation of the logical layer, transport layer, data link layer, and physical layer of the BIC 513, relatively high bandwidth requirements of the PE may be supported as well as different system configurations. For example, the physical layer may be operable to run at 5 GB/s per pair and to have a total raw output bandwidth of 35 GB/s and a raw input bandwidth of 25 GB/s. The physical layer bandwidth may be divided between two interfaces whose maximum bandwidth can be 30 GB/s out and 25 GB/s in. The bandwidth of each interface may be configured in increments of 5 GB/s. Preferably, the sum of the two interfaces cannot exceed the total bandwidth of the physical layer.

Further details of the BIC 513 interface will now be provided. The BIC 513 is a point-to-point bus between the PE, memory subsystems, switches, bridge chips, etc. and is a logical extension of the MIB 512. The BIC 513 supports the attachment of many devices with bridge chips or switches. The single physical device is operable to perform the tasks of multiple device types. These device types include: Master, Snooper, Slave, Memory, Bus Adapter, and I/O Bridge. A Master may be, for example, a bus device that arbitrates for and drives the command bus. A Snooper may be, for example, a bus device that watches activity on the command bus in order to keep some cached data coherent with other system caches. A bus adapter or I/O bridge may contain a cache and if so, acts like a snooper, e.g., it maintains coherency between cached data and other system caches. A Slave may be, for example, a bus device that responds to a memory read or write command. A slave can contain memory, or I/O registers, or both. A memory device is an example of a slave. A Memory may be, for example, a bus device that responds to a memory read or write and handles positive acknowledgment for coherent operations. If some portion of memory is attached to a remote bus, then the bus adapter performs the duties of memory for memory accesses to that remote memory space. A Bus Adapter may be, for example, a gateway to another bus, which may have the same or different bus architecture, and which preferably uses the rerun protocol to pass coherent operations to the remote bus. An I/O Bridge may be, for example, a gateway to an I/O bus, which may not cache data in the exclusive or modified state. The bridge may not provide for coherency with the I/O bus; however, it preferably contains an I/O directory for data cached in the shared state by I/O devices and. therefore, does not use the rerun protocol to pass coherent operations to the I/O bus. The bridge may support programmed I/O (PIO) or memory-mapped I/O devices.

The BIC 513 architecture is preferably based on separate command, data, and (snoop-) response packets. These packets preferably run independently, allowing for split transactions in which there is no timing relationship between command packets and data packets except that the command packet preferably precedes the data packet. The requests and replies are tagged to allow out-of-order replies, which are common for I/O to another bus or in a non-uniform memory access (NUMA) environment.

In the coherent SMF configuration, the command packets contain address and control information that describes the transaction to be performed on the BIF. An address concentrator receives the command packets, determines the order in which the commands are processed, and selects a command. The selected command packet is sent (reflected) by the master device to the slave device on the BIF in the format of a reflected command. After receiving a reflected command packet, the slave sends a reply to the master in the form of a snoop response packet. The snoop response packet indicates the acceptance or rejection of the reflected command packet. In some cases, the slave may not be the final destination for the transaction. For these cases, the slave is responsible for forwarding the request to the final destination and does not generate a snoop response packet. Typically, a command packet is a request for a data transaction. For requests such as coherency management and synchronization, the command packet is the complete transaction. When the request is for a data transaction, data packets containing control information and the requested data are transferred between the master and slave. Depending on the transport layer definition, command and data packets may be simultaneously sent and received by both devices on the BIF.

In the non-coherent configuration, the command packets preferably contain address and control information which describe the transaction to be performed on the IOIF. Command packets are sent by the master to the slave device on the IOIF in the form of a IOIF command. After receiving a command packet, the slave sends a reply to the master in the form of a IOIF response packet. The response packet indicates the acceptance or rejection of the IOIF command packet. In some cases the slave may not be the final destination for the transaction. For these cases, the slave is responsible for forwarding the request to the final destination. Typically an IOIF command packet is a request for a data transaction. For requests such as interrupts and interrupt resend operations, the command packet is the complete transaction. When the request is for a data transaction, data packets containing control information and the requested data are transferred between the master and slave. Depending on the transport layer definition, command and data packets may be simultaneously sent and received by both devices on the IOIF.

The BIC 513 provides an asynchronous interface between the MIB and the I/O interfaces, and hence contains speed matching SRAM buffers and logic, and three clock domains. The processor side operates at half rate, the I/O side operates at one third the rate of the RRACs, and a small distribution network operates at half the rate of the RRACs. Due to the high speed of the transmitters and receivers, the RRACs and BIC 513 require calibration. For BIC 513 calibration, an elastic buffer is used to eliminate the skew between the bytes comprising the interface.

As discussed above, the BIC 513 offers two flexible interfaces: (i) the dual I/O interfaces (IOIF 0/1); and (ii) the I/O and coherent SMP interface (IOIF & BIF). This permits significant flexibility in the system configuration into which one or more of the processor elements is disposed.

Figure 4:
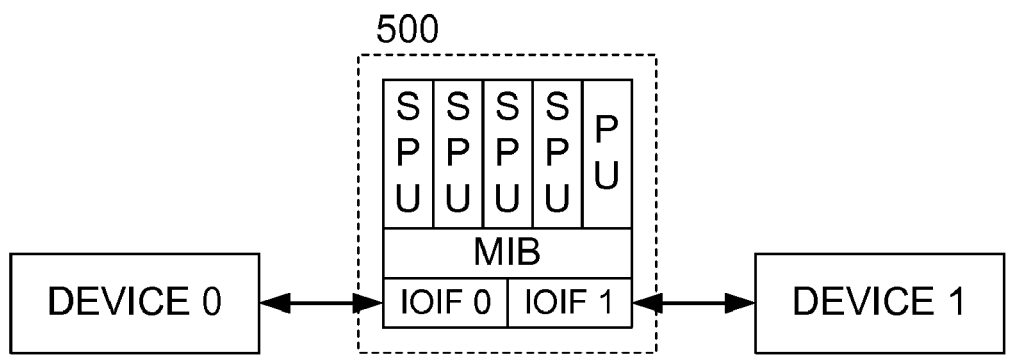
FIG. 4 is a block diagram illustrating an example of how one or more aspects of the multi-processor system may be employed to achieve a processing configuration.

For example, as illustrated in FIG. 4, the BIC 513 may be operable to implement dual I/O interfaces (IOIF0 and IOIF1) to set up respective non-coherent interfaces between the PE 500 and two devices, device 0 and device 1. In this configuration, a single PE 500 may send and receive data over each of IOIF0 and IOIF1.

As discussed above, the physical layer input/output bandwidth of the BIC 513 may be divided between the two interfaces (BIF-BIF, IOIF-IOIF, and/or BIF-IOIF) as long as the sum of the two interfaces does not exceed the total bandwidth of the physical layer (e.g., 30 GB/s out and 25 GB/s in). Assuming that device 0 is a high throughput device, such as a graphics engine, and device 1 is a lower throughput device, such as an I/O bridge, the bandwidth of the BIC 513 may be divided in an advantageous way to achieve a suitable configuration. For example, the IOIF 0 non-coherent interface to the graphics engine (device 0) may be 30 GB/s out and 20 GB/s in, while the IOIF 1 non-coherent interface to the I/O bridge (device 1) may be 2.5 GB/s out and 2.5 GB/s in (assuming that 2.5 GB/s increments are available).

Figure 5:
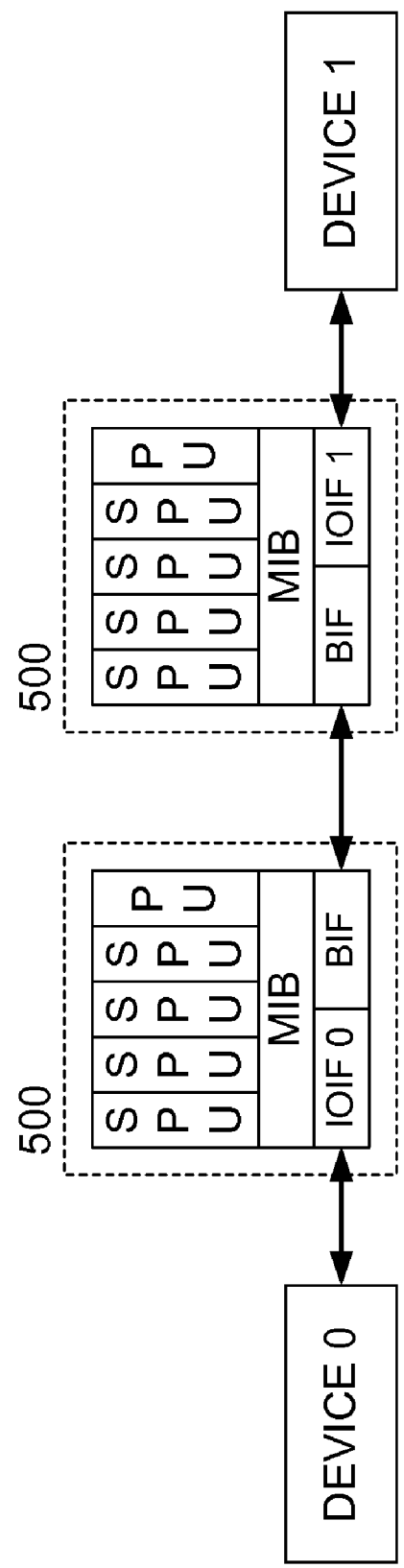
FIG. 5 is a block diagram illustrating an example of how one or more aspects of the multi-processor system may be employed to achieve a further processing configuration.

As illustrated in FIG. 5, two processor elements 500 may be cascaded by each employing its respective BIC 513 in a coherent SMP interface (BIF) configuration. The coherent SMP interface (BIF) of each processing element 500 is coupled to one another to set up a coherent interface therebetween. The IOIF of each processing element 500 may send and receive data to/from other devices in a non-coherent fashion.

Again, the physical layer input/output bandwidth of the BIC 513 may be divided between the two interfaces. Assuming that device 0 and device 1 are relatively low throughput devices, such as I/O bridges, the bandwidths of the respective BIC 513s may be divided in an advantageous way to achieve a suitable configuration. For example, the IOIF 0 non-coherent interface to device 0 may be 5 GB/s out and 5 GB/s in, the IOIF 1 non-coherent interface to device 1 may be 5 GB/s out and 5 GB/s in, and the coherent BIF interface between the processing elements 500 may be 20 GB/s in and 20 GB/s out.

Figure 6:
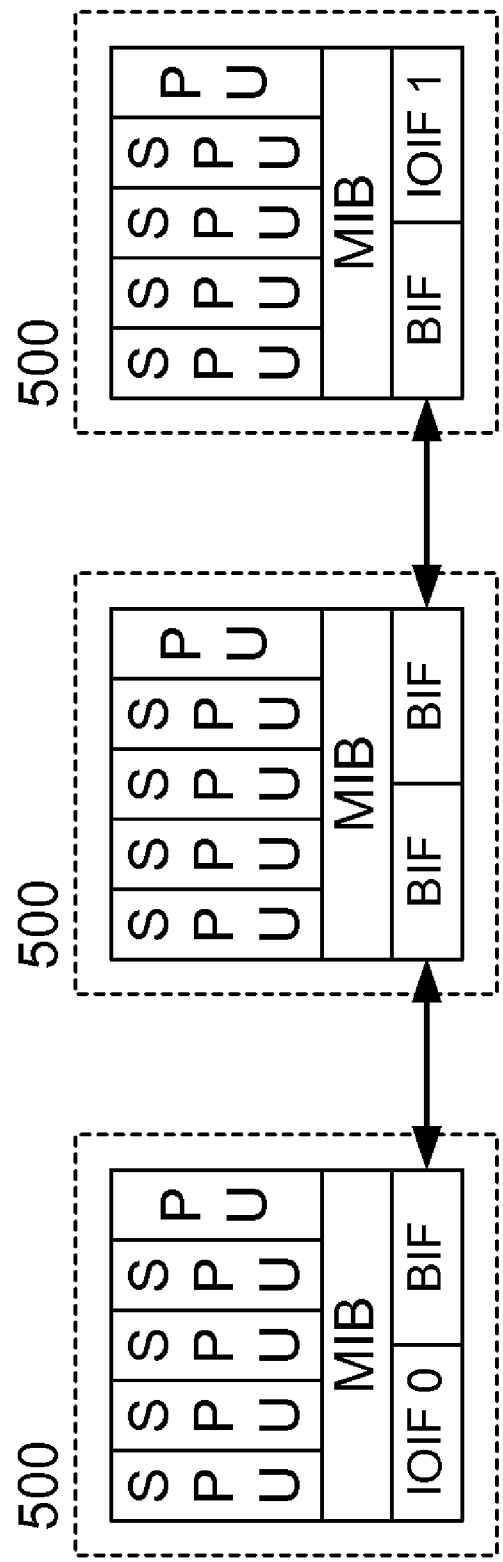
FIG. 6 is a block diagram illustrating an example of how one or more aspects of the multi-processor system may be employed to achieve a still further processing configuration.

As illustrated in FIG. 6, more than two processor elements 500 may be cascaded by each employing its respective BIC 513 in a coherent SMP interface (BIF) configuration. The central processor element 500 employs a BIC 513 having two BIFs. The BIF of each processing element 500 is coupled to one another to set up a coherent interface therebetween. The IOIF of the end processing elements 500 may send and receive data to/from other devices in a non-coherent fashion.

Figure 7:
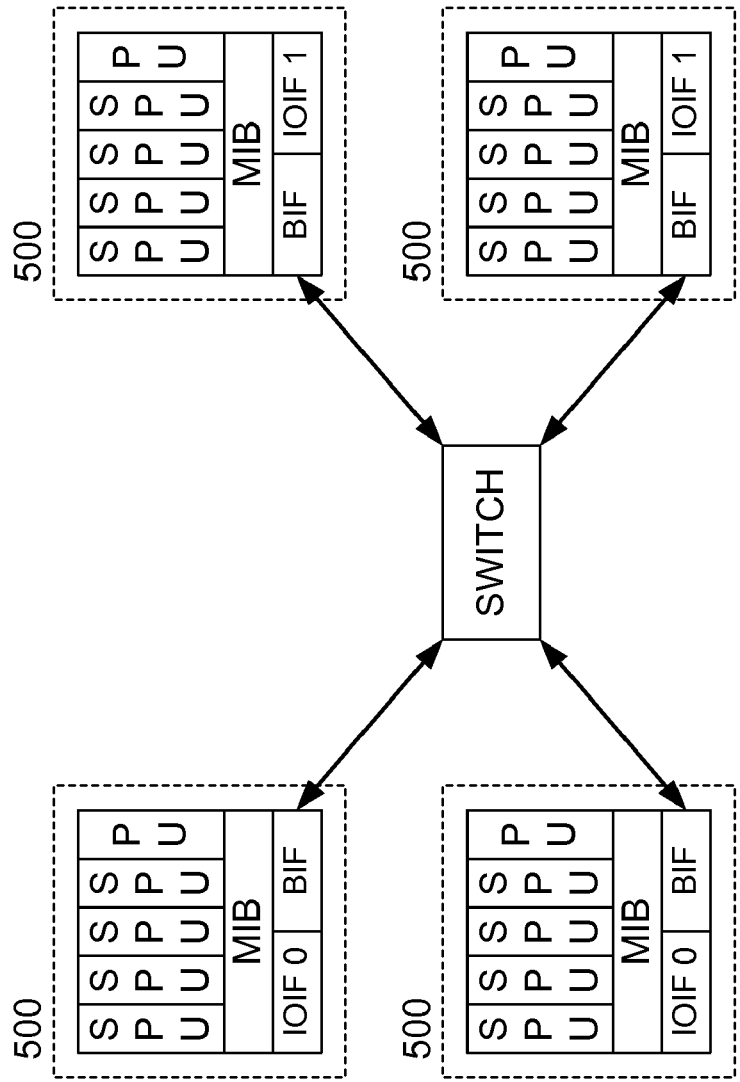
FIG. 7 is a block diagram illustrating an example of how one or more aspects of the multi-processor system may be employed to achieve a still further processing configuration.

As illustrated in FIG. 7, more than two processor elements 500 may be cascaded by each employing its respective BIC 513 in the I/O and coherent SMP interface (IOIF & BIF) configuration. The coherent SMP interface (BIF) of each processing element 500 may be coupled to a switch, which effectively couples the processing elements 500 to one another to set up a coherent interface therebetween. The IOIF of each processing element 500 may send and receive data to/from other devices in the system in a non-coherent fashion.

The SPUs share system memory with the PPU via coherent translated and protected DMA but store data and instructions in a private real address space supported by a 256K local storage (LS) dedicated to each SPU. The SPUs provide much of the computational performance of the processor element. Each of the eight processors contains a 128-bit wide dual-issue SIMD dataflow that is fully pipelined for all operations except double-precision floating-point. Operands are provided by a unified 128-entry by 128-bit register file. Each SPU has a 256 kB single ported LS that supports full-bandwidth concurrent read and write DMA accesses to the MIB, as well as 16-Byte SPU loads and stores and instruction (pre) fetch. The SPUs access main storage by issuing DMA commands with an effective address (EA) to the associated MFC. The MFC applies the standard Power Architecture address translation to the EA and then asynchronously transfers data between the local storage and main storage. This allows overlapping communication and computation and facilitates real-time operation. SPU access to shared memory via DMA, a large register file, and standard in-order execution semantics provide a general-purpose streaming programming environment. Each SPU can be dynamically configured to operate in a mode in which its resources can only be accessed by validated programs.

Figure 8:
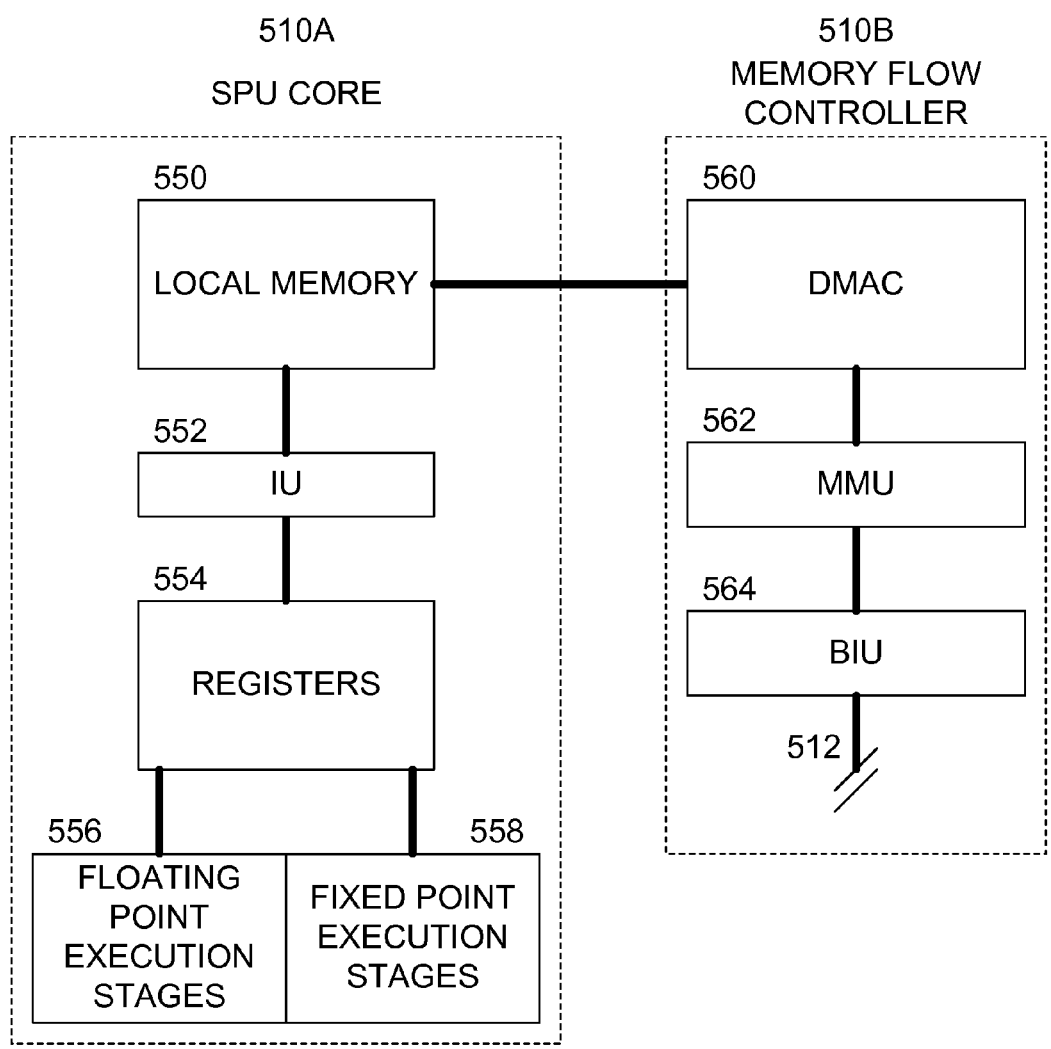
FIG. 8 is a diagram illustrating the structure of an exemplary sub-processing unit (SPU) of the system of FIG. 1 that may be adapted in accordance with one or more further aspects of the present invention.

FIG. 8 illustrates further details of an exemplary sub-processing unit (SPU) 508. The SPU 508 architecture preferably fills a void between general-purpose processors (which are designed to achieve high average performance on a broad set of applications) and special-purpose processors (which are designed to achieve high performance on a single application). The SPU 508 is designed to achieve high performance on game applications, media applications, broadband systems, etc., and to provide a high degree of control to programmers of real-time applications. Some capabilities of the SPU 508 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub-processing unit 508 includes two basic functional units, namely an SPU core 510A and a memory flow controller (MFC) 510B. The SPU core 510A performs program execution, data manipulation, etc., while the MFC 510B performs functions related to data transfers between the SPU core 510A and the DRAM 514 of the system.

The SPU core 510A includes a local memory 550, an instruction unit (IU) 552, registers 554, one or more floating point execution stages 556 and one or more fixed point execution stages 558. The local memory 550 is preferably implemented using single-ported random access memory, such as an SRAM. Whereas most processors reduce latency to memory by employing caches, the SPU core 510A implements the relatively small local memory 550 rather than a cache. Indeed, in order to provide consistent and predictable memory access latency for programmers of real-time applications (and other applications as mentioned herein) a cache memory architecture within the SPU 508A is not preferred. The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 550 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 508 references the associated local memory 550 using a local address, however, each location of the local memory 550 is also assigned a real address (RA) within the overall system's memory map. This allows Privilege Software to map a local memory 550 into the Effective Address (EA) of a process to facilitate DMA transfers between one local memory 550 and another local memory 550. The PU 504 can also directly access the local memory 550 using an effective address. In a preferred embodiment, the local memory 550 contains 556 kilobytes of storage, and the capacity of registers 552 is 128×128 bits.

The SPU core 504A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 552 includes an instruction buffer, instruction decode circuitry, dependency check circuitry, and instruction issue circuitry.

The instruction buffer preferably includes a plurality of registers that are coupled to the local memory 550 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 550, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution). It is preferred that the dependency check circuitry determines dependencies of multiple instructions dispatched from the decoder circuitry 112 simultaneously.

The instruction issue circuitry is operable to issue the instructions to the floating point execution stages 556 and/or the fixed point execution stages 558.

The registers 554 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU core 510A is of a superscalar architecture, such that more than one instruction is issued per clock cycle. The SPU core 510A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 556 and fixed point execution stages 558 may be employed. In a preferred embodiment, the floating point execution stages 556 operate at a speed of 32 billion floating point operations per second (32 GFLOPS), and the fixed point execution stages 558 operate at a speed of 32 billion operations per second (32 GOPS).

The MFC 510B preferably includes a bus interface unit (BIU) 564, a memory management unit (MMU) 562, and a direct memory access controller (DMAC) 560. With the exception of the DMAC 560, the MFC 510B preferably runs at half frequency (half speed) as compared with the SPU core 510A and the bus 512 to meet low power dissipation design objectives. The MFC 510B is operable to handle data and instructions coming into the SPU 508 from the bus 512, provides address translation for the DMAC, and snoop-operations for data coherency. The BIU 564 provides an interface between the bus 512 and the MMU 562 and DMAC 560. Thus, the SPU 508 (including the SPU core 510A and the MFC 510B) and the DMAC 560 are connected physically and/or logically to the bus 512.

The MMU 562 is preferably operable to translate effective addresses (taken from DMA commands) into real addresses for memory access. For example, the MMU 562 may translate the higher order bits of the effective address into real address bits. The lower-order address bits, however, are preferably untranslatable and are considered both logical and physical for use to form the real address and request access to memory. In one or more embodiments, the MMU 562 may be implemented based on a 64-bit memory management model, and may provide $2^{64}$ bytes of effective address space with 4K-, 64K-, 1M-, and 16M-byte page sizes and 256 MB segment sizes. Preferably, the MMU 562 is operable to support up to $2^{65}$ bytes of virtual memory, and $2^{42}$ bytes (4 TeraBytes) of physical memory for DMA commands. The hardware of the MMU 562 may include an 8-entry, fully associative SLB, a 256-entry, 4way set associative TLB, and a 4×4 Replacement Management Table (RMT) for the TLB—used for hardware TLB miss handling.

The DMAC 560 is preferably operable to manage DMA commands from the SPU core 510A and one or more other devices such as the PU 504 and/or the other SPUs. There may be three categories of DMA commands: Put commands, which operate to move data from the local memory 550 to the shared memory 514; Get commands, which operate to move data into the local memory 550 from the shared memory 514; and Storage Control commands, which include SLI commands and synchronization commands. The synchronization commands may include atomic commands, send signal commands, and dedicated barrier commands. In response to DMA commands, the MMU 562 translates the effective address into a real address and the real address is forwarded to the BIU 564.

The SPU core 510A preferably uses a channel interface and data interface to communicate (send DMA commands, status, etc.) with an interface within the DMAC 560. The SPU core 510A dispatches DMA commands through the channel interface to a DMA queue in the DMAC 560. Once a DMA command is in the DMA queue, it is handled by issue and completion logic within the DMAC 560. When all bus transactions for a DMA command are finished, a completion signal is sent back to the SPU core 510A over the channel interface.

The processor element contains a 64-bit processing unit 504 (or power processing unit (PPU)) compliant to the family of Power Architecture processors. It is implemented as a dual-threaded core with the Integer, Floating Point, VMX and MMU units of the Power Architecture. The processor contains 32 kB Instruction and data caches, a 512 kB L2 cache, and on-chip bus interface logic. The processor is a new ground up implementation of a core with extended pipelines to achieve a low FO4 to match the SPU. The core is an enhanced in-order design with a moderate pipeline length to provide state-of-art performance capabilities. The PPU has been extended with resource management tables for the cache and translation tables to support real time operations. Through Memory mapped I/O control registers, the PPU can also initiate DMA requests on behalf of an SPU and support communication with SPU mailboxes. It also implements the Power Architecture hypervisor extensions to allow multi concurrent operating systems to be run on it at the same time through thread management support.

Figure 9:
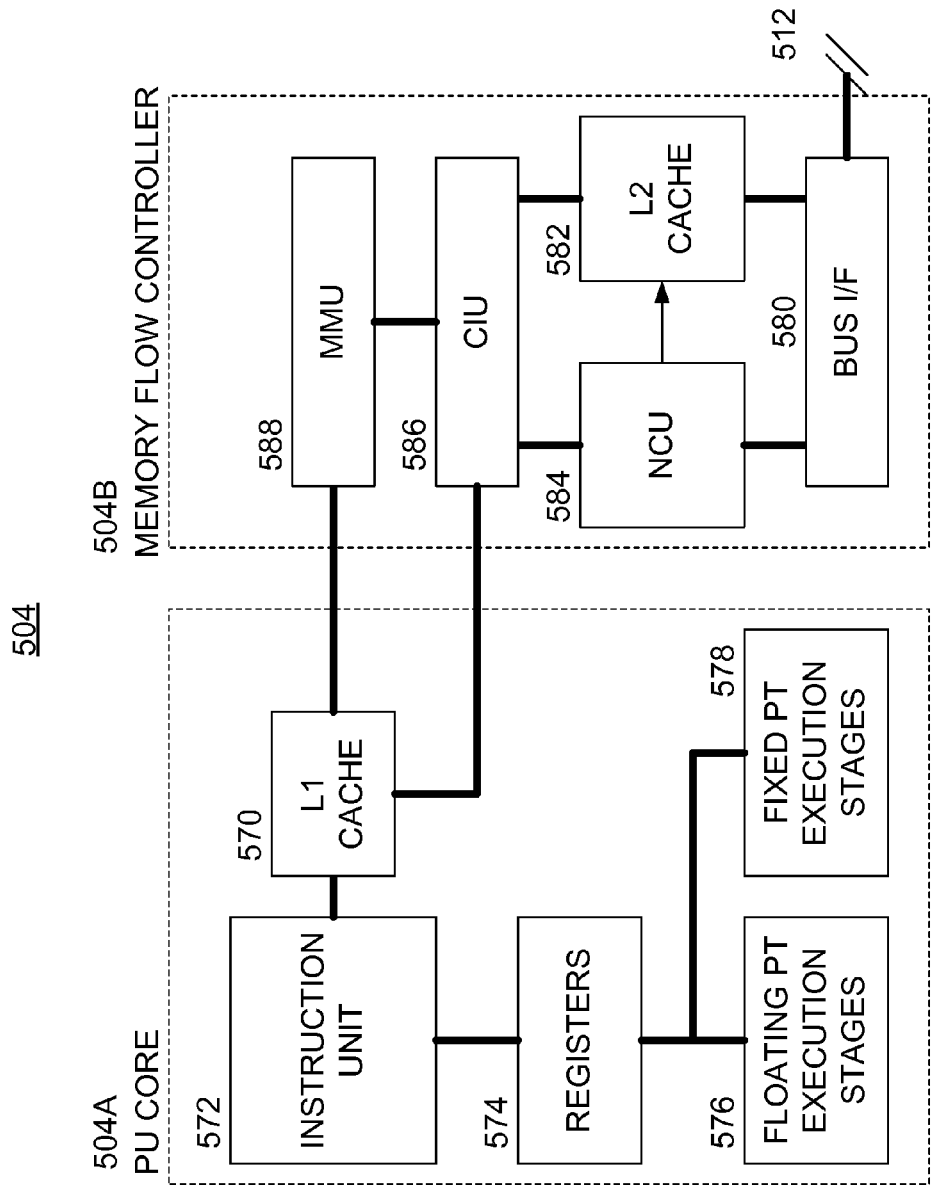
FIG. 9 is a diagram illustrating the structure of an exemplary processing unit (PU) or power processing unit (PPU) of the system of FIG. 1 that may be adapted in accordance with one or more further aspects of the present invention.

FIG. 9 illustrates an exemplary structure and function of the PU 504. The PU 504 includes two basic functional units, the PU core 504A and the memory flow controller (MFC) 504B. The PU core 504A performs program execution, data manipulation, multi-processor management functions, etc., while the MFC 504B performs functions related to data transfers between the PU core 504A and the memory space of the system 100.

The PU core 504A may include an L1 cache 570, an instruction unit 572, registers 574, one or more floating point execution stages 576 and one or more fixed point execution stages 578. The L1 cache provides data caching functionality for data received from the shared memory 106, the processors 102, or other portions of the memory space through the MFC 504B. As the PU core 504A is preferably implemented as a superpipeline, the instruction unit 572 is preferably implemented as an instruction pipeline with many stages, including fetching, decoding, dependency checking, issuing, etc. The PU core 504A is also preferably of a superscalar configuration, whereby more than one instruction is issued from the instruction unit 572 per clock cycle. To achieve a high processing power, the floating point execution stages 576 and the fixed point execution stages 578 include a plurality of stages in a pipeline configuration. Depending upon the required processing power, a greater or lesser number of floating point execution stages 576 and fixed point execution stages 578 may be employed.

The MFC 504B includes a bus interface unit (BIU) 580, an L2 cache memory, a non-cachable unit (NCU) 584, a core interface unit (CIU) 586, and a memory management unit (MMU) 588. Most of the MFC 504B runs at half frequency (half speed) as compared with the PU core 504A and the bus 108 to meet low power dissipation design objectives.

The BIU 580 provides an interface between the bus 108 and the L2 cache 582 and NCU 584 logic blocks. To this end, the BIU 580 may act as a Master as well as a Slave device on the bus 108 in order to perform fully coherent memory operations. As a Master device it may source load/store requests to the bus 108 for service on behalf of the L2 cache 582 and the NCU 584. The BIU 580 may also implement a flow control mechanism for commands which limits the total number of commands that can be sent to the bus 108. The data operations on the bus 108 may be designed to take eight beats and, therefore, the BIU 580 is preferably designed around 128 byte cache-lines and the coherency and synchronization granularity is 128 KB.

The L2 cache memory 582 (and supporting hardware logic) is preferably designed to cache 512 KB of data. For example, the L2 cache 582 may handle cacheable loads/stores, data pre-fetches, instruction fetches, instruction pre-fetches, cache operations, and barrier operations. The L2 cache 582 is preferably an 8-way set associative system. The L2 cache 582 may include six reload queues matching six (6) castout queues (e.g., six RC machines), and eight (64-byte wide) store queues. The L2 cache 582 may operate to provide a backup copy of some or all of the data in the L1 cache 570. Advantageously, this is useful in restoring state(s) when processing nodes are hot-swapped. This configuration also permits the L1 cache 570 to operate more quickly with fewer ports, and permits faster cache-to-cache transfers (because the requests may stop at the L2 cache 582). This configuration also provides a mechanism for passing cache coherency management to the L2 cache memory 582.

The NCU 584 interfaces with the CIU 586, the L2 cache memory 582, and the BIU 580 and generally functions as a queueing/buffering circuit for non-cacheable operations between the PU core 504A and the memory system. The NCU 584 preferably handles all communications with the PU core 504A that are not handled by the L2 cache 582, such as cache-inhibited load/stores, barrier operations, and cache coherency operations. The NCU 584 is preferably run at half speed to meet the aforementioned power dissipation objectives.

The CIU 586 is disposed on the boundary of the MFC 504B and the PU core 504A and acts as a routing, arbitration, and flow control point for requests coming from the execution stages 576, 578, the instruction unit 572, and the MMU unit 588 and going to the L2 cache 582 and the NCU 584. The PU core 504A and the MMU 588 preferably run at full speed, while the L2 cache 582 and the NCU 584 are operable for a 2:1 speed ratio. Thus, a frequency boundary exists in the CIU 586 and one of its functions is to properly handle the frequency crossing as it forwards requests and reloads data between the two frequency domains.

The CIU 586 is comprised of three functional blocks: a load unit, a store unit, and reload unit. In addition, a data pre-fetch function is performed by the CIU 586 and is preferably a functional part of the load unit. The CIU 586 is preferably operable to: (i) accept load and store requests from the PU core 504A and the MMU 588; (ii) convert the requests from full speed clock frequency to half speed (a 2:1 clock frequency conversion); (iii) route cachable requests to the L2 cache 582, and route non-cachable requests to the NCU 584; (iv) arbitrate fairly between the requests to the L2 cache 582 and the NCU 584; (v) provide flow control over the dispatch to the L2 cache 582 and the NCU 584 so that the requests are received in a target window and overflow is avoided; (vi) accept load return data and route it to the execution stages 576, 578, the instruction unit 572, or the MMU 588; (vii) pass snoop requests to the execution stages 576, 578, the instruction unit 572, or the MMU 588; and (viii) convert load return data and snoop traffic from half speed to full speed.

The MMU 588 preferably provides address translation for the PU core 540A, such as by way of a second level address translation facility. A first level of translation is preferably provided in the PU core 504A by separate instruction and data ERAT (effective to real address translation) arrays that may be much smaller and faster than the MMU 588.

In a preferred embodiment, the PU 504 operates at 4-6 GHz, 10F04, with a 64-bit implementation. The registers are preferably 64 bits long (although one or more special purpose registers may be smaller) and effective addresses are 64 bits long. The instruction unit 570, registers 572 and execution stages 574 and 576 are preferably implemented using PowerPC technology to achieve the (RISC) computing technique.

Additional details regarding the modular structure of this computer system may be found in U.S. Pat. No. 6,526,491, the entire disclosure of which is hereby incorporated by reference.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A multiprocessor system, comprising:
a plurality of processors operatively coupled to one another over one or more communication busses; and
a configurable interface circuit operating in a first mode and a second mode, either simultaneously or alternatively, in response to one or more control signals, where: (i) the first mode provides a coherent symmetric interface interconnecting the multiprocessor system and one or more external devices, and maintains cache coherency between one or more memories of the multiprocessor and one or more memories of the one or more external devices; and (ii) the second mode provides a non-coherent interface interconnecting the multiprocessor system and one or more external devices, and provides at least some memory protection of the one or more memories of the multiprocessor,
wherein the configurable interface circuit includes a coherent bus having a logical extension with first and second interfaces, each interface operating in one of the first mode and the second mode in response to the one or more control signals.

2. The multiprocessor system of claim 1, wherein the configurable interface circuit operates in the first mode and the second mode simultaneously.

3. The multiprocessor system of claim 1, wherein the configurable interface circuit operates in the first mode when the one or more control signals are in a first state, and in the second mode when the one or more control signals are in a second state.

4. The multiprocessor system of claim 1, further comprising:
a plurality of multiprocessors, each including a plurality of the processors operatively coupled to one another over one or more communication busses; and
a plurality of the configurable interface circuits, at least one such configurable interface circuit located within each multiprocessor,
wherein each configurable interface circuit includes first and second interfaces, each interface operating independently in one of the first mode and the second mode in response to one or more control signals.

5. The multiprocessor system of claim 4, further comprising:
a first external device coupled to one of the multiprocessors through the first interface thereof, operating in the second mode; and
a second external device coupled to the one of the multiprocessors through the second interface thereof, operating in the second mode.

6. The multiprocessor system of claim 4, further comprising:
at least two of the multiprocessors being interconnected via first interfaces thereof operating in the first mode;
a first external device coupled to one of the at least two multiprocessors through the second interface thereof, operating in the second mode; and
a second external device coupled to the other of the at least two multiprocessors through the second interface thereof, operating in the second mode.

7. The multiprocessor system of claim 4, further comprising:
first and second ones of the multiprocessors being interconnected via first interfaces thereof operating in the first mode; and
the first one and a third one of the multiprocessors being interconnected via second and first interfaces thereof, respectively operating in the first mode,
wherein the second interfaces of the second and third multiprocessors are operable for interconnection with one of more external devices.

8. The multiprocessor system of claim 7, further comprising:
a first external device coupled to one of the second and third multiprocessors through the second interface thereof, operating in the second mode; and
a second external device coupled to the other of the second and third multiprocessors through the second interface thereof, operating in the second mode.

9. The multiprocessor system of claim 4, further comprising:
a multi-port data switch; and
a plurality of the multiprocessors coupled to the switch via first interfaces thereof, operating in the first mode,
wherein the second interfaces of the multiprocessors are operable for interconnection with one of more external devices.

10. The multiprocessor system of claim 9, further comprising at least one external device coupled to one of the multiprocessors through the second interface thereof, operating in the second mode.

11. The multiprocessor system of claim 1, wherein the configurable interface circuit includes a logical layer, a transport layer, and a physical layer.

12. The multiprocessor system of claim 11, wherein
the logical layer defines coherency rules for operating in the first mode, and ordering rules for operating in the second mode,
the transport layer defines command and data packet configurations for transmission between the multiprocessor and the one or more external devices, and
the physical layer defines electrical characteristics and timing of memory access commands, memory snoop requests, and data transfers between the multiprocessor and the one or more external devices.

13. The multiprocessor system of claim 11, wherein the physical layer of the configurable interface circuit includes means for dividing a total bandwidth thereof between any portion of the configurable interface circuit operating as a coherent symmetric interface and any portion of the configurable interface circuit operating as a non-coherent interface.

14. The multiprocessor system of claim 13, wherein the total bandwidth includes an aggregate of a maximum output bandwidth and a maximum input bandwidth.

15. The multiprocessor system of claim 14, wherein at least one of:
a sum of respective output bandwidths of the coherent symmetric interface and the non-coherent interface does not exceed the maximum output bandwidth; and
a sum of respective input bandwidths of the coherent symmetric interface and the non-coherent interface does exceed the maximum input bandwidth.

16. The multiprocessor system of claim 1, wherein the configurable interface circuit facilitates memory access commands, memory snoop requests, and data transfers between the multiprocessor and the one or more external devices.

17. The multiprocessor system of claim 16, wherein the memory access commands, memory snoop requests, and data transfers are in the form of asynchronous, independent packets.

18. The multiprocessor system of claim 17, wherein the packets include address information and control information defining a desired transaction.

19. A method, comprising:
 providing a plurality of processors operatively coupled to one another over one or more communication busses; and
 configuring an interface circuit, which includes a coherent bus having a logical extension with first and second interfaces, each interface operating in one of a first mode and a second mode in response to one or more controls, where: (i) the first mode provides a coherent symmetric interface;
 and (ii) the second mode provides a non-coherent interface, wherein the coherent symmetric interface interconnects the multiprocessor and one or more external devices to maintain cache coherency between one or more memories of the multiprocessor and one or more memories of the one or more external devices, and the non-coherent interface interconnects the multiprocessor and one or more external devices to provide at least some memory protection of the one or more memories of the multiprocessor.

20. The method of claim 19, further comprising coupling at least one external device to the configurable interface circuit.

21. The method of claim 20, further comprising servicing memory access commands, memory snoop requests, and/or data transfers between the processors and the one or more external devices.

* * * * *